US012300102B2

(12) United States Patent
Gur Arie

(10) Patent No.: US 12,300,102 B2
(45) Date of Patent: May 13, 2025

(54) TRAFFIC PATHWAY ALERTING SYSTEM

(71) Applicant: Einav Gur Arie, Tel Aviv (IL)

(72) Inventor: Einav Gur Arie, Tel Aviv (IL)

( * ) Notice: Subject to any disclaimer, the term of this patent is extended or adjusted under 35 U.S.C. 154(b) by 198 days.

(21) Appl. No.: 18/017,419

(22) PCT Filed: May 11, 2021

(86) PCT No.: PCT/IL2021/050534
§ 371 (c)(1),
(2) Date: Jan. 23, 2023

(87) PCT Pub. No.: WO2022/018713
PCT Pub. Date: Jan. 27, 2022

(65) Prior Publication Data

US 2023/0274639 A1 Aug. 31, 2023

(30) Foreign Application Priority Data

Jul. 21, 2020 (IL) .......................................... 276204

(51) Int. Cl.

| | |
|---|---|
| ***G08G 1/095*** | (2006.01) |
| ***E01F 9/30*** | (2016.01) |
| ***E01F 9/529*** | (2016.01) |
| ***E01F 9/547*** | (2016.01) |
| ***E01F 9/559*** | (2016.01) |
| ***G08G 1/017*** | (2006.01) |
| ***G08G 1/052*** | (2006.01) |
| ***G08G 1/056*** | (2006.01) |

(52) U.S. Cl.
CPC ............... *G08G 1/095* (2013.01); *E01F 9/30* (2016.02); *E01F 9/529* (2016.02); *E01F 9/559* (2016.02); *G08G 1/0175* (2013.01); *G08G 1/052* (2013.01); *G08G 1/056* (2013.01)

(58) Field of Classification Search
None
See application file for complete search history.

(56) References Cited

U.S. PATENT DOCUMENTS

| | | | | |
|---|---|---|---|---|
| 10,253,468 | B1 * | 4/2019 | Linville | E01F 9/559 |
| 2005/0270175 | A1 * | 12/2005 | Peddie | G08G 1/096783 246/473 R |
| 2010/0133435 | A1 * | 6/2010 | Maillart | G01N 21/3504 250/338.5 |
| 2013/0063282 | A1 * | 3/2013 | Baldwin | B61L 29/282 340/941 |
| 2016/0076207 | A1 * | 3/2016 | Moran | G08G 1/096716 340/905 |
| 2017/0288722 | A1 * | 10/2017 | Berry | G01S 1/68 |
| 2018/0253964 | A1 * | 9/2018 | Wong | G08G 1/0141 |
| 2020/0119449 | A1 * | 4/2020 | Pretorius | H01Q 1/48 |
| 2021/0087756 | A1 * | 3/2021 | Shah | E01C 5/00 |

* cited by examiner

*Primary Examiner* — John F Mortell
(74) *Attorney, Agent, or Firm* — AlphaPatent Associates Ltd.; Daniel J. Swirsky

(57) ABSTRACT

The present invention is directed to a pathway alerting system, comprising: at least two alerting devices (30), disposed distantly from each other, in line, along a pathway (100), each alerting device (30) comprising: an alarm; a sensor (35) for detecting a transient vehicle; a communication module with at least one adjacent alerting device (30); and a mechanism for: upon detecting a transient vehicle by the sensor (35), instructing via the communication module at least one adjacent alerting device (30) to turn on its alarm.

21 Claims, 6 Drawing Sheets

TRAFFIC PATHWAY ALERTING SYSTEM

TECHNICAL FIELD

The present invention relates to the field of traffic pathway warning systems.

BACKGROUND ART

Bicycles and scooters are familiar personal transport vehicles. In the recent years other types of personal transport vehicles have been invented, such as electric bicycles, electric scooters, Segway, and more. Such vehicles are usually limited to a speed of 35 km/h. Because of their low cost comparable to a car, transportation in these vehicles has become popular, and large cities are leasing such vehicles to the public. Along with the popularity of these personal vehicles, municipalities assign for them special lanes, in parallel to pedestrian lanes. Lanes for such vehicles are called "bike lanes" although they are used for any personal low-speed vehicle, whether motorized or not.

Due to the high load of personal low-speed vehicles on bicycle lanes, such vehicles tend to deviate from their lanes to the parallel lane of pedestrians; and also pedestrians tend to deviate from their lane to the bicycle lanes. As a result, there has been an increase in the number of accidents of both riders and pedestrians. Such accidents can cause injuries and even end in death.

As such, there is a long felt need for a solution to the problem of pedestrian crossing to bike lane, and vice versa.

Other objects and advantages of the invention will become apparent as the description proceeds.

SUMMARY OF THE INVENTION

The present invention is directed to a pathway alerting system, comprising:

at least two alerting devices (30), disposed distantly from each other, in line, along a pathway (100), each alerting device (30) comprising:

an alarm;

a sensor (35) for detecting a transient vehicle;

a communication module with at least one adjacent alerting device (30); and a mechanism for: upon detecting a transient vehicle by said sensor (35), instructing via said communication module at least one adjacent alerting device (30) to play its alarm.

Preferably, the number of adjacent alerting devices instructed to play their alarm is a function of a velocity of the transient vehicle, so that a time until the vehicle reaches to a pedestrian is sufficient to allow the pedestrian to move to another lane of the pathway.

According to one embodiment of the invention, the sensor is adapted to detect a moving direction of the transient vehicle.

Preferably, the mechanism is adapted to turn on an alarm of at least one adjacent alerting device (30) in the vehicle's moving direction.

According to one embodiment of the invention, the sensor (35) comprises two infrared sensors (35*a*, 35*b*), one for detecting a vehicle only at a front side thereof, and one only for detecting a vehicle only at a back side thereof, thereby allowing detecting a moving direction and velocity of transient vehicle by a time difference between disappearance of the vehicle from one of the infrared sensors and its appearance on a second of the infrared sensors.

According to another embodiment of the invention, a velocity and direction of a vehicle is detected by the time difference between detection of the vehicle by two adjacent alerting devices.

Preferably, the alarm comprises visual alerting means, such as one or more LEDs, colored illumination element, blinking illumination element, and the like.

Preferably, the alarm comprises audio alerting means, such as a speaker.

The communication module may be wired, as well as wireless.

Preferably, the power supply of each of the alerting devices is a solar panel; however, the power supply may be from an external power source.

Preferably, the alerting devices are adapted to be installed on the ground; however the alerting devices (30) may be adapted to be installed above the ground level.

Each of the alerting devices (30) may further comprise an ID detector of a transient vehicle, for reporting about detecting the vehicle to a monitoring and control center, thereby allowing performing an operations such as locating the vehicle in an urban space, disabling the vehicle (e.g., in case of stolen vehicle), displaying an alarm installed on the vehicle, displaying an alarm installed on the alerting device (30), and so on.

According to one embodiment of the invention, the ID detector comprises a camera (24) for photographing an image of an ID plate of the vehicle, and OCR decoder for decoding an ID form the photographed image.

According to another embodiment of the invention, the ID detector comprises an RFID reader, for detecting an ID stored in an RFID tag installed in said transient vehicle.

Of course, an ID detector may take other forms, especially in a form of an ID stored in the vehicle, wherein said vehicle communicating with an ID reader of an alerting device.

According to one embodiment of the invention, each of the alerting devices (30) comprises a green LED and a red LED, for indicating allowed and forbidden moving direction in a pedestrian pathway.

According to one embodiment of the invention, each of the alerting devices (30) comprises a blue LED, for indicating that moving in both directions in allowed.

Preferably, each of the sensors comprises a shutter, for limiting a detection region thereof.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

It should be noted that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Figure 1:
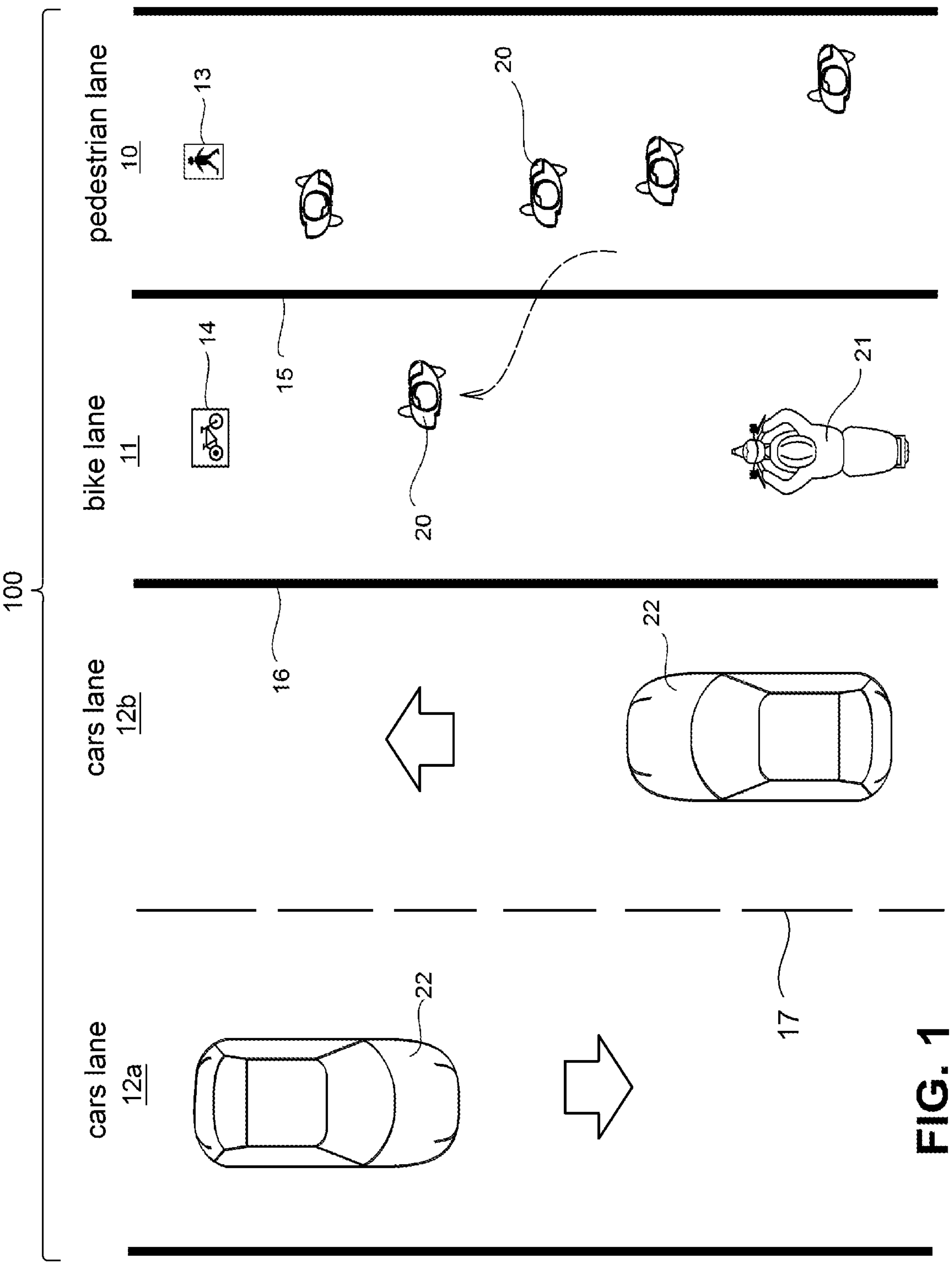
FIG. 1 PRIOR ART
FIG. 1 schematically illustrates a top view of a pathway 100, according to the prior art.

FIG. 1 schematically illustrates a top view of a pathway 100, according to the prior art.

The pathway comprises three lanes, a pedestrian lane 10, a bike lane 11 and a car lane having two sub lanes 12*a* and 12*b*, separated by a separation line 17.

Also illustrated in this figure are pedestrians 20, biker 21, cars 22, a separation line 15 between the pedestrian lane 10 and the bike lane 11, and separation line 16 between the bike lane 11 and the car lane 12*b*.

Reference numeral 13 is an icon on the ground of lane 10, denoting that it is a pedestrian lane; and reference numeral 14 is an icon on the ground of lane 11 denoting that it is a bike lane.

As illustrated, sometimes pedestrians walk on the bike lane, usually due to the overload on the pedestrian lane 10. In addition, bikers also tend to move to the pedestrians lane from the same reason. As a result, accidents may occur.

Figure 2:
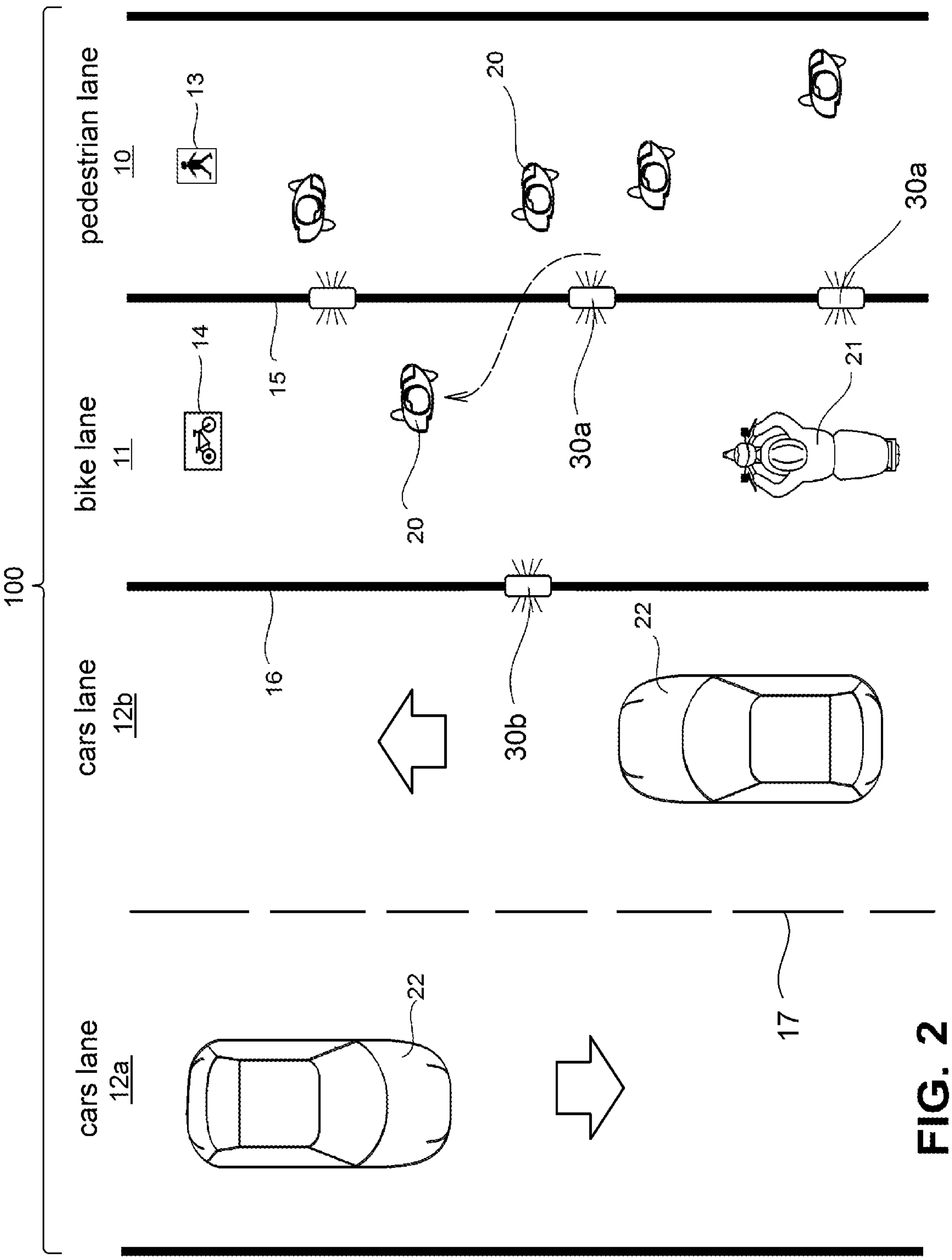
FIG. 2 schematically illustrates a top view of a pathway 100, according to one embodiment of the invention.

FIG. 2 schematically illustrates a top view of a pathway 100, according to one embodiment of the invention.

Along the separation line 15 are disposed alerting devices 30*a*, distantly from each other, e.g., 3-5 m. Each of the alerting devices 30*a* is applicable for alerting a pedestrian walking on bike lane 11 that a bike is approaching to him, so that he can return to the pedestrian's lane 10. Such alerting device includes an alarm that generates visual and/or audio signal.

Each of the alerting devices 30*a* comprises sensor(s) that detects a transient bike, and instructs several alerting devices ahead (i.e., in the transient bike direction) to turn on their alarm, so that a pedestrian present on the wrong lane is alerted. This way the chance of accident is diminished tremendously. The alarm can be turned off after a predetermined time period, and the alerting device ahead can blink can blink, for example, for a predetermined period of a few seconds.

Thus, each of the alerting devices 30 is in communication with other alerting devices on the lane 15, especially its adjacent alerting devices.

On separation line 16 also are disposed alerting devices 30*b*. Since a vehicle moves in a faster speed than a bike, the distance between each of the alerting devices 30*b* is preferably greater than the distance between two consequent alerting devices 30*a*.

The distance between the alerting devices along a separation line may depend on an average speed of the vehicles/bikes along this pathway.

The alerting devices may be adapted to alert on an approaching car. Such adaption may be, for example, setting the minimum speed that characterizes a transient car (rather than a bike), and placing the alerting devices along separation line 16 between the cars lane 12*b* and the bike lane 11.

When implementing the present invention to cars or any registered vehicle (such as a rentable bike), a camera may be installed in each of the alerting devices, for photographing a license number of a transient vehicle (urban rentable bike), and saving thereof in a database, for further use, such as locating the rentable urban bike. Of course, other means for detecting an identity of a vehicle can be used, such as RFID, short range communication between the vehicle and the alerting device through which the identification of the vehicle is acquired, etc.

Figure 3:
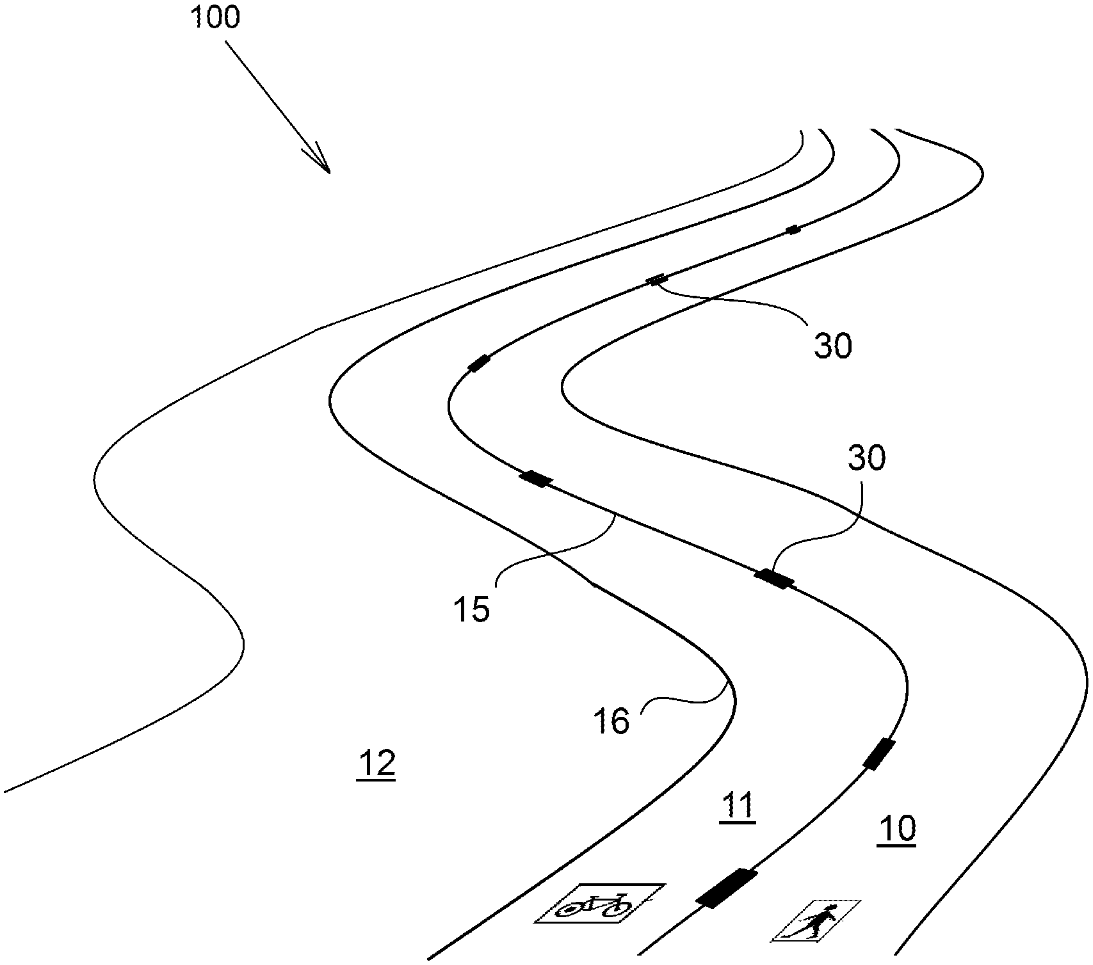
FIG. 3 is a perspective view of a pathway 100, according to one embodiment of the invention.

FIG. 3 is a perspective view of a pathway 100, according to one embodiment of the invention.

The pathway 100 comprises three lanes: a pedestrian lane 10, a bike lane 11 and a car lane 12. Separation line 15 separates between the pedestrian lane and the bike lane. Separation line 16 separates between bike lane 11 and the car lane 12.

Along the separation line 15 are disposed, distantly from each other, pedestrian oriented alerting devices 30.

It should be noted that the lanes are not drawn in the correct scale.

Figure 4:
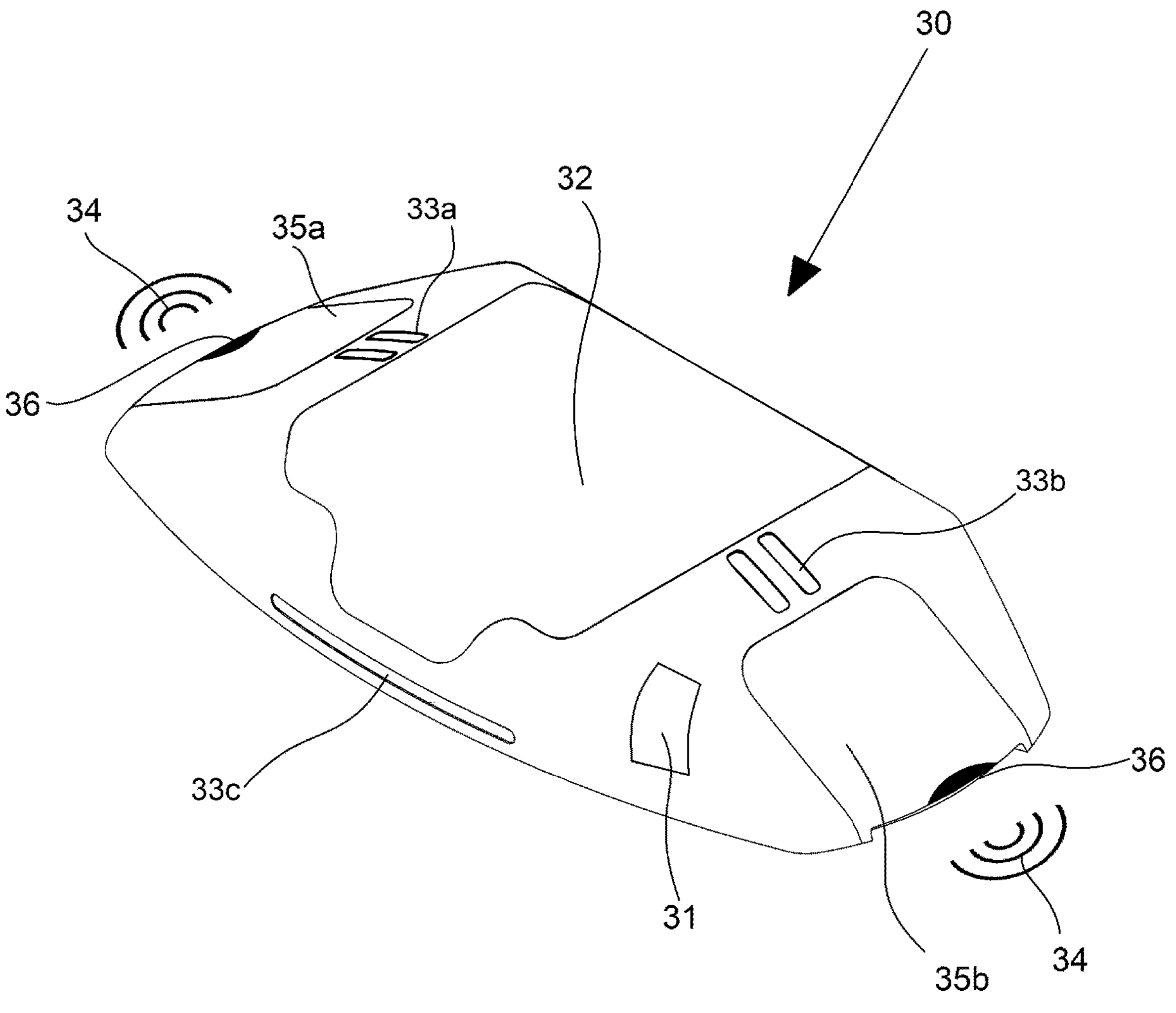
FIG. 4 is a perspective view of an alerting device 30, according to one embodiment of the invention.

FIG. 4 is a perspective view of an alerting device 30, according to one embodiment of the invention.

The alerting device 30 comprises sensors 35*a* and 35*b* for detecting a transient bike, vehicle, scooter, etc.; LEDs (Light Emitting Diode) 33*a*, 33*b* and 33*c*, a speaker 31, a solar panel 32 for providing power to the unit. The LED may be colored, blinking, etc. LED is a preferred option since its intensity is relatively high with illumination reference to the power it consumes. An alert of an alerting device means that a LEDs is turned on, a sound is played by the speaker, etc.

Each of the infrared sensors may comprise a shutter, for focusing the detection zone to 50 cm and higher. This feature allows detection of 30 degrees from the ground, and a distance of 1.7 m. Of course, this is merely an example.

If the pedestrian lane is a one-way lane, the front LED 33*a*, the back LED 33*b* can be used for indicating the right direction. For example, green lights indicate correct moving direction, and red lights indicate a wrong direction. A blue or any different color may indicate that there is no restriction of the moving direction.

LED 33*c* is a side LED that can blink when a vehicle is passing by, illuminate a dark path, etc. Side LEDs may be from both sides of the alerting device.

The design of the alerting device 30 which is illustrated in FIG. 4 is oriented for ground installation, i.e., to cause minimum interference as possible to the traffic on the pathway. However, an alerting device may be installed also on a pole, and on other constructions.

As per the sensors for detecting a transient bike and the like, the following is a possible solution. The solution takes in account the following facts:

(a) a bike has a rider, and the rider can be detected by an infrared sensor; and (b) a rider moves faster than a pedestrian.

Accordingly, two infrared sensors 35*a* and 35*b* are installed in each alerting device, one for detecting an object only at the front side of the alerting device 30, and one for detecting an object only at the back side thereof. The speed and direction of the object can be determined by the time that passes from its disappearance from one infrared sensor, and appearance of the object on the other detector. If the speed is higher than a predetermined threshold, it is assumed that it is of a vehicle such as bike, scooter, etc., is transient. The predetermined time can be deduced by trial and error.

The order of the detection of the object by the infrared sensors is used to detect the moving direction of the vehicle.

According to another embodiment of the invention, the speed and direction is detected by the time difference a vehicle is detected at two adjacent alerting deices.

Of course, these are merely examples, and other ways for detecting a transient bike, its velocity and direction can be used.

Upon detecting a transient bike, several alerting devices ahead in the movement direction enter into an alerting mode in which the LEDs are turned on, an audio signal (sound, music) is played, etc. After a while (e.g., several seconds), each of the alarms turn off their alerting mode, i.e., their LEDs are turned off, and the audio signal ceases.

The electric power to an alerting device can be supplied by the solar panel 32. Alternatively or additionally, the power can be supplied by a cable connected to an electric power source.

FIG. 4 also shows a communication module 36 through which one alerting devices communicates with other alerting devices via communication signal 34.

The communication may be, for example, Bluetooth communication in the case the distances between the alerting devices 30 corresponds to a Bluetooth standard, and actually it can be any wired or wireless communication technologies, even over cellphone lines. Thus, the communication can be between the alerting devices disposed on a pathway, and also with a monitoring and control center which is reported about traffic on the pathway.

Figure 5:
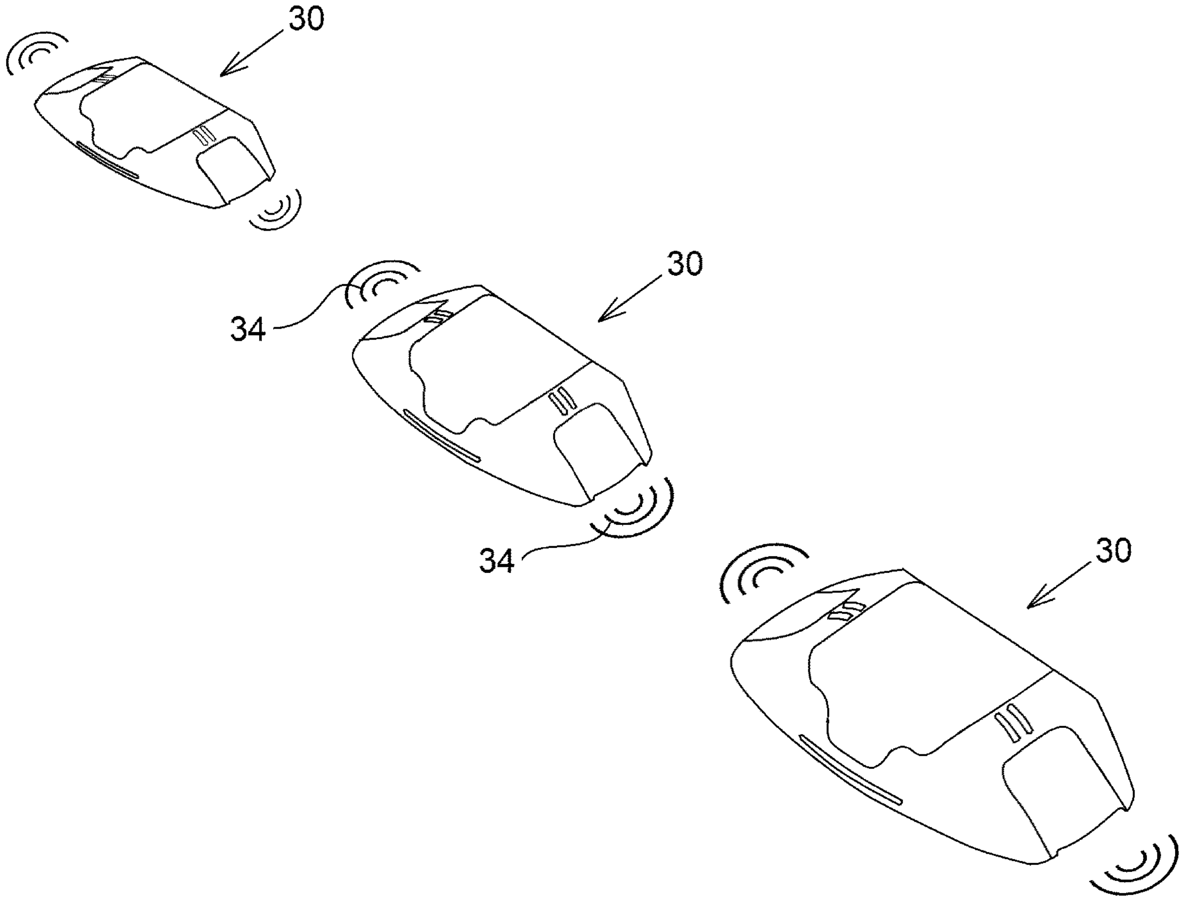
FIG. 5 pictorially illustrates a plurality of alerting devices 30, communicating with each other by wireless communication signal 34.

FIG. 5 pictorially illustrates a plurality of alerting devices 30, communicating with each other by wireless communication signal 34.

The communication can be between the alerting devices, or with a monitoring and control center which concentrates traffic information of the pathway.

The communication can be wired as well as wireless.

The power supply to the alerting devices may be external, or self-powered, e.g., by a solar panel installed in each alerting device, etc.

Figure 6:
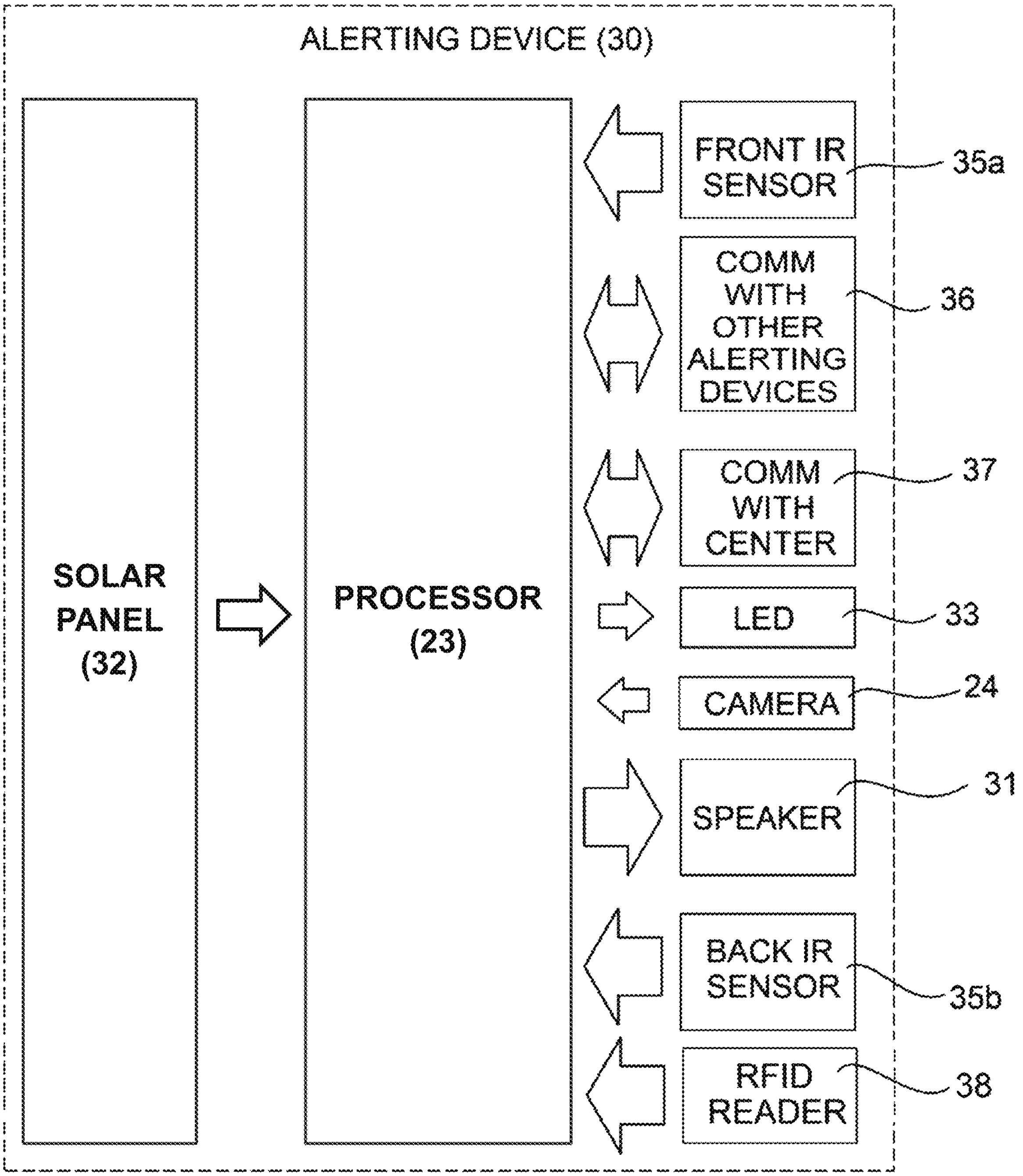
FIG. 6 is a block diagram illustrating dataflow in an alerting device, according to one embodiment of the invention.

FIG. 6 is a block diagram illustrating dataflow in an alerting device, according to one embodiment of the invention.

This is merely an example, and the dataflow can be designed differently.

The "brains" of the alerting device 30 is a processor 23, which is in data or signal communication with a front infrared sensor 35*a*, and a back infrared sensor 35*b*.

The processor is merely an example, and it can be replaced by a circuitry.

The processor detects a transient vehicle from the readings of the front sensor 35*a* and back sensor 35*b*, and also detect its velocity (as explained hereinabove).

Once a vehicle is detected (by its velocity which is faster than of a walking or running human being), it communicates via the communication module 36 with adjacent alarm(s) in the vehicle's movement direction, and instructs them to turn on their alarm, i.e., blink the LEDs 33, play a sound via speaker 31, and so on.

When the alerting devices are communicating with wireless communication means, Bluetooth Low Energy is a preferred option.

A solar panel can be used for providing electric power to the processor and other components. The electric power can be stored in a chargeable battery, for use during night time. Also, when the power diminishes, the lighting intensity of the lighting components can be reduced.

The alerting device may also comprise a camera, for photographing transient vehicles that have a license plate. By decoding the vehicle number, this information may be sent to a monitoring and control center, which may enter the license number into a database, in order to locate a rented urban bike, suspend the vehicle if indicated as stolen, and the like. The transmission to the monitoring and control center may be carried out by communication module 37, which may use a cellular network or other available network for this purpose. Upon detecting that the vehicle is stolen, if the vehicle has a disabling mechanism, the vehicle can be disabled. Additionally or alternatively, an alarm on the vehicle can be turned on, a siren can sound, a LED can light in red and blue, etc.

According to another embodiment of the invention, the alerting device comprises an RFID reader, for reading an ID of a vehicle in which an RFID tag is installed. Some municipalities prefer to equip their two-wheel vehicles that are offered to the public by an RFID tag. The identification tag can be used for insurance purposes (e.g., to prove the insurant company that the vehicle belongs to the municipality), etc.

The RFID tag is merely an example, and other forms of embedding an ID in a vehicle and allowing accessing it can be used.

According to one embodiment of the invention, a sensor indicates whether the vehicle is on a pedestrian pathway. In this case the vehicle can be disabled, an alarm can be played, the vehicle can be photographed for prosecution, etc.

According to a preferred embodiment of the invention, the power supply is wired. In this case, the power wire can be used for communication between the alerting devices. Of course, other wired communication methods can be used, such as bus architecture, local network, etc.

In the figures and/or description herein, the following reference numerals (Reference Signs List) have been mentioned:

- numeral 100 denotes a pathway, according to one embodiment of the invention;
- numeral 10 denotes a pedestrian lane;
- numeral 11 denotes a bike lane;
- each of numeral 12, 12*a* and 12*b* denotes a car lane;
- numeral 13 denotes an icon embedded on the ground for denoting a pedestrian lane;
- numeral 14 denotes an icon embedded on the ground for denoting a bike lane;
- numeral 15 denotes a separation line between a pedestrian lane and a bike lane;
- numeral 16 denotes a separation line between a bike lane and a car lane;
- numeral 17 denotes a separation line between two car lanes;
- numeral 20 denotes a pedestrian;
- numeral 21 denotes a bike;
- numeral 22 denotes a car;
- numeral 23 denotes a processor;
- each of numerals 30, 30*a* and 30*b*, denotes an alerting device;
- numeral 24 denotes a camera;
- numeral 31 denotes a speaker;
- numeral 32 denotes a solar panel;
- each of numerals 33, 33*a* 33*b* and 33*c*, denotes a visual alerting device, such as a LED;
- numeral 34 communication signal;
- each of numerals 35, 35*a* and 35*b*, denotes sensor(s);

numeral 36 denotes a communication module, for communication with other alerting devices or a monitoring and control center;

numeral 37 denotes a communication module, for communicating with a monitoring and control center; and numeral 38 denotes an RFID reader.

In the figures and/or description herein, the following terms have been mentioned:

ID is the abbreviation of identification;

OCR is the acronym of Optical Character Recognition;

RFID is the acronym of Radio-Frequency Identification;

LED is the acronym of Light Emission Diode; and

Bluetooth is a wireless technology standard used for exchanging data.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A traffic pathway alerting system, comprising:

at least two alerting devices (30), disposed distantly from each other, in line, along a pathway (100) having a pedestrian lane (10) along a bike lane (11), each alerting device (30) comprising:

an alarm;

a sensor (35) for detecting a transient vehicle; and a mechanism for: upon detecting a transient vehicle by said sensor (35), instructing at least one adjacent alerting device (30) to play its alarm, wherein a number of adjacent alerting devices instructed to play their alarm is a function of a velocity of said transient vehicle, so that a time until said vehicle reaches a pedestrian walking on said bike lane is sufficient to allow said pedestrian to move to another lane of said pathway.

2. A system according to claim 1, wherein said sensor is adapted to detect a moving direction of said transient vehicle.

3. A system according to claim 2, wherein said mechanism is adapted to turn on an alarm of at least one adjacent alerting device (30) in said vehicle's moving direction.

4. A system according to claim 1, wherein said sensor (35) comprises two infrared sensors (35*a*, 35*b*), one for detecting a vehicle only at a front side thereof, and one only for detecting a vehicle only at a back side thereof, thereby allowing detecting a moving direction and velocity of transient vehicle by a time difference between disappearance of said vehicle from one of said infrared sensors and its appearance on a second of said infrared sensors.

5. A system according to claim 1, wherein a velocity and direction is detected by a time difference a vehicle is detected by two adjacent alerting devices.

6. A system according to claim 1, wherein said alarm comprises visual alerting means.

7. A system according to claim 6, wherein said visual alerting means comprises an item selected from a group comprising: LED, colored illumination element, blinking illumination element.

8. A system according to claim 1, wherein said alarm comprises audio alerting means.

9. A system according to claim 1, wherein said mechanism supports wired communications.

10. A system according to claim 1, wherein said mechanism supports wireless communications.

11. A system according to claim 1, wherein a power supply of each of said alerting devices is a solar panel.

12. A system according to claim 1, wherein a power supply of each of said alerting devices is an external power source.

13. A system according to claim 1, wherein said at least one of said alerting devices is adapted to be installed on the ground.

14. A system according to claim 1, wherein said at least one of said alerting devices (30) is adapted to be installed above the ground level.

15. A system according to claim 1, wherein each of said at least one of said alerting devices (30) further comprises an ID detector of a transient vehicle, for reporting thereof to a monitoring and control center, thereby allowing performing an operation selected from a group consisting of: locating said vehicle in an urban space, disabling said vehicle, displaying an alarm installed on said vehicle, and displaying an alarm installed on said alerting device (30).

16. A system according to claim 15, wherein said ID detector of a transient vehicle is a camera (24) for photographing an image of an ID plate of said vehicle, and OCR decoder for decoding an ID form said image.

17. A system according to claim 15, wherein said ID detector of a transient vehicle is an RFID reader, for detecting an ID stored in an RFID tag installed in said transient vehicle.

18. A system according to claim 15, wherein said ID detector is in a form of an ID stored in the vehicle, wherein said vehicle communicating with an ID reader of an alerting device.

19. A system according to claim 1, wherein each of said alerting devices (30) comprises a green LED and a red LED, for indicating allowed and forbidden moving direction in a pedestrian pathway.

20. A system according to claim 1, wherein each of said alerting devices (30) comprises a blue LED, for indicating that moving in both directions in allowed.

21. A system according to claim 1, wherein each of said sensors comprises a shutter, for limiting a detection region thereof.

* * * * *